US007920351B2

(12) United States Patent
Cho et al.

(10) Patent No.: US 7,920,351 B2
(45) Date of Patent: Apr. 5, 2011

(54) METHOD OF SETTING AC ERASE FREQUENCY AND AC ERASE METHOD BASED ON DATA FREQUENCY

(75) Inventors: Sung-youn Cho, Suwon-si (KR); Keung-ho Hong, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 12/028,931

(22) Filed: Feb. 11, 2008

(65) Prior Publication Data

US 2008/0212221 A1 Sep. 4, 2008

(30) Foreign Application Priority Data

Feb. 16, 2007 (KR) ........................ 10-2007-0016799

(51) Int. Cl.
*G11B 5/02* (2006.01)
(52) U.S. Cl. ........................................................ 360/57
(58) Field of Classification Search .................... 360/57, 360/17, 39, 43, 66, 75
See application file for complete search history.

(56) References Cited

U.S. PATENT DOCUMENTS

| | | | | |
|---|---|---|---|---|
| 6,351,340 | B2 * | 2/2002 | Dixon | 360/66 |
| 6,777,113 | B2 * | 8/2004 | Trindade et al. | 428/829 |
| 6,791,774 | B1 * | 9/2004 | Albrecht et al. | 360/17 |
| 7,012,773 | B2 | 3/2006 | Ashikaga et al. | |
| 7,079,345 | B1 * | 7/2006 | Nguy et al. | 360/66 |
| 7,821,734 | B2 * | 10/2010 | Amemiya | 360/67 |
| 2006/0139788 | A1 * | 6/2006 | Yang et al. | 360/75 |
| 2007/0247741 | A1 * | 10/2007 | Akagi et al. | 360/75 |

FOREIGN PATENT DOCUMENTS

| | | |
|---|---|---|
| JP | 08-212736 | 8/1996 |
| JP | 09-17115 | 1/1997 |
| JP | 2000-100077 | 4/2000 |
| JP | 2004-14092 | 1/2004 |
| KR | 1993-3466 | 4/1993 |
| KR | 10-594308 | 6/2006 |

OTHER PUBLICATIONS

Korean Office Action dated Mar. 14, 2008 issued in KR 10-2007-16799.

* cited by examiner

*Primary Examiner* — Fred Tzeng
(74) *Attorney, Agent, or Firm* — Stanzione & Kim, LLP

(57) ABSTRACT

A method of setting an AC erase frequency using a data frequency of a disk area and an AC erase method. The method of setting the AC erase frequency includes obtaining a data frequency for each disk area, and setting an AC erase frequency for each disk area based on the data frequency for each disk area.

20 Claims, 5 Drawing Sheets

METHOD OF SETTING AC ERASE FREQUENCY AND AC ERASE METHOD BASED ON DATA FREQUENCY

CROSS-REFERENCE TO RELATED APPLICATIONS

This application claims priority under 35 U.S.C. §119(a) from Korean Patent Application No. 10-2007-0016799, filed on Feb. 16, 2007, in the Korean Intellectual Property Office, the disclosure of which is incorporated herein in its entirety by reference.

BACKGROUND OF THE INVENTION

1. Field of the Invention

The present general inventive concept relates to a method of setting an AC erase frequency of a disk drive, and more particularly, to a method of setting an AC erase frequency and an AC erase method based on a data frequency of a disk area.

2. Description of the Related Art

In a process of manufacturing hard disk drives, AC erase signals are recorded onto a data area in order to remove noise signal of the data area. This recording process is referred to as an AC erase process.

In a general AC erase method, AC erase signals with the same frequency are recorded onto all the areas of the disk. In this case, there occurs a problem that interference occurs among AC erase signals in an inner zone of the disk.

SUMMARY OF THE INVENTION

The present general inventive concept provides a method of setting an AC erase frequency based on a data frequency of a disk area.

The present general inventive concept also provides an AC erase method using an AC erase frequency that is set based on a data frequency of a disk area.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a method of setting an AC erase frequency of a disk drive, the method including obtaining a data frequency for each disk area, and setting an AC erase frequency for each disk area based on the data frequency for each disk area.

In the obtaining of the data frequency, the data frequency of the disk area may be obtained based on a cylinder number of the disk area.

In the setting of the AC erase frequency, the AC erase frequency may be set so as to be greater than a frequency in which interference occurs among AC erase signals.

In the setting of the AC erase frequency, the AC erase frequency can be set so that an AC erase frequency of an inner zone of the disk area is lower than that of an outer zone of the disk area.

In the setting of the AC erase frequency, when the data frequency is greater than a triple of a servo frequency, the AC erase frequency may be set to the triple of the servo frequency.

In the setting of the AC erase frequency, when the data frequency is less than the triple of the servo frequency, the AC erase frequency may be set to a value less than the triple of the servo frequency.

In the setting of the AC erase frequency, when the data frequency is less than the triple of the servo frequency, the AC erase frequency can be set to an MC (maintenance cylinder) frequency.

In the setting of the AC erase frequency, when the data frequency is less than a value obtained by subtracting a predetermined margin from a number double the servo frequency or when the data frequency is greater than a value obtained by adding a predetermined margin to the number double the servo frequency, the AC erase frequency may be set to the data frequency of the disk area.

In the setting of the AC erase frequency, when the data frequency is located between a value obtained by subtracting a predetermined margin from number double the servo frequency and a value obtained by adding a predetermined margin to the number double the servo frequency, the AC erase frequency may be set to an MC (maintenance cylinder) frequency.

The disk area may be a zone including at least one track.

The foregoing and/or other aspects and utilities of the present general inventive concept are also achieved by providing an AC erase method of a disk drive, the AC erase method including obtaining a data frequency for each disk area, setting an AC erase frequency for each disk area based on the data frequency for each disk area, and performing an AC erase process for each disk area by using the AC erase frequency for each disk area.

In the obtaining of the data frequency, the data frequency of the disk area may be obtained based on a cylinder number of the disk area.

In the setting of the AC erase frequency, the AC erase frequency may be set to be greater than a frequency in which interference occurs among AC erase signals.

In the setting of the AC erase frequency, the AC erase frequency may be set so that an AC erase frequency of an inner zone of the disk area is lower than that of an outer zone of the disk area.

In the setting of the AC erase frequency, when the data frequency is greater than a triple of a servo frequency, the AC erase frequency may be set to the triple of the servo frequency.

In the setting of the AC erase frequency, when the data frequency is less than the triple of the servo frequency, the AC erase frequency may be set to a value less than the triple of the servo frequency.

In the setting of the AC erase frequency, when the data frequency is less than the triple of the servo frequency, the AC erase frequency may be set to an MC (maintenance cylinder) frequency.

In the setting of the AC erase frequency, when the data frequency is less than a value obtained by subtracting a predetermined margin from a number double the servo frequency or when the data frequency is greater than a value obtained by adding a predetermined margin to the number double the servo frequency, the AC erase frequency may be set to the data frequency of the disk area.

In the setting of the AC erase frequency, when the data frequency is located between a value obtained by subtracting a predetermined margin from a number double the servo frequency and a value obtained by adding a predetermined margin to the number double the servo frequency, the AC erase frequency may be set to an MC (maintenance cylinder) frequency.

The foregoing and/or other aspects and utilities of the present general inventive concept are also achieved by providing a method to set an AC erase frequency for a disk in a disk drive, the method including obtaining a data frequency for each of a plurality of disk areas of the disk, and setting AC erase frequencies for each of the plurality of disk areas, such that the AC erase frequencies of a first disk area does not cause interference in AC erase frequencies of a second disk area.

The second disk area may correspond to an inner disk area and the first disk area corresponds to an outer disk area.

The method may further include performing an AC erase process for each of the plurality of disk areas by using the AC erase frequencies of the corresponding disk areas.

The data frequency for a disk area may correspond to a cylinder number of the disk area.

The AC erase frequency for each disk area may be based on a servo frequency.

The AC erase frequency may be set to the data frequency of the disk area when the data frequency is less than a number double the servo frequency The AC erase frequency may be set to the data frequency of the disk area when the data frequency is greater than a number double the servo frequency.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
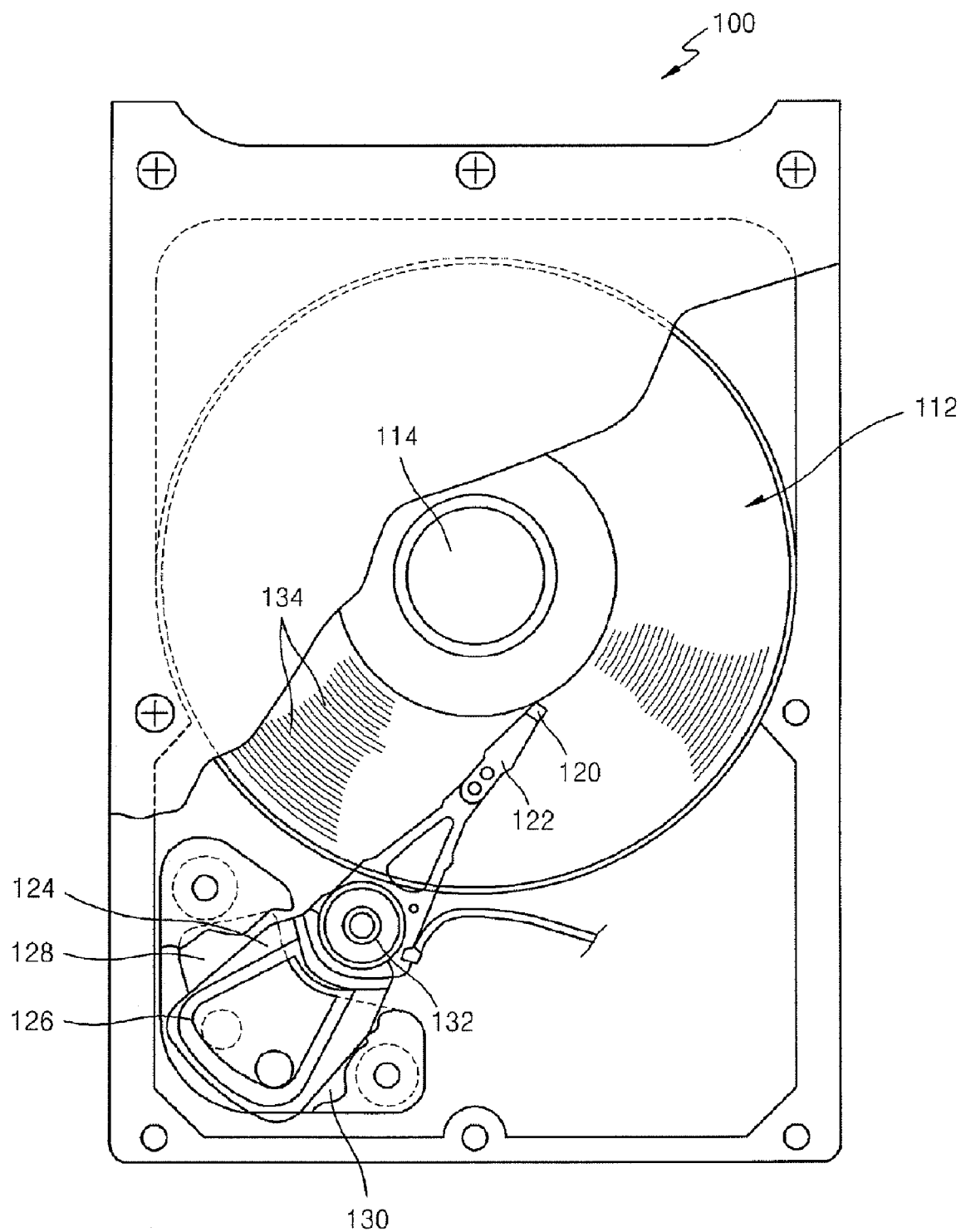
FIG. 1 is a top plan view illustrating a head disk assembly of a disk drive to which the present general inventive concept is applied.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A hard disk drive is obtained by combining a head disk assembly (HDA) constructed with mechanical components with an electric circuit.

FIG. 1 illustrates an exemplary structure of a HDA of a hard disk drive to which the present general inventive concept can be applied.

A hard disk drive 100 may include at least one disk 112 rotated by a spindle motor 114. The hard disk drive 100 also may include a head 120 adjacent to the surface of the disk 112.

The head 120 can read information from the rotating disk 112 or record information onto the disk by sensing a magnetic field generated on the surface of the disk 112 or magnetizing the surface of the disk 112. Although FIG. 1 illustrates a single head, it has to be understood that the head 120 can be constructed with a recording head to magnetize the disk 112 and a separated reading head to sense the magnetic field of the disk 112.

The head 120 can have a structure to generate an air bearing between the head 120 and the surface of the disk 112. The head 120 can be combined with a head stack assembly (HSA) 122. The HSA 122 can be adhered to an actuator arm 124 including a voice coil 126. The voice coil 126 can be adjacent to a magnetic assembly 128 which supports a voice coil motor (VCM) 130. A current that is supplied to the voice coil 126 generates torque which rotates the actuator arm 124 with respect to a bearing assembly 132. The head 120 can move across the surface of the disk 112 due to the rotation of the actuator arm 124.

Information is stored in annular tracks of the disk 112. In general, the disk 112 is constructed with a data zone in which user data is recorded, a parking zone onto which the head 120 is parked when the hard disk drive 100 is not used, and a maintenance cylinder. In the maintenance cylinder, compensation values to obtain a default value of a recording current in high and low temperatures, a control value for a PTP control, an M value, a difference d and d' to distinguish features of a head, the features of the head, and recording current compensation values based on the features of the head. The features of the head are distinguished through methods illustrated in FIGS. 4 and 5. The distinguishment result is recorded in the maintenance cylinder.

Figure 2:
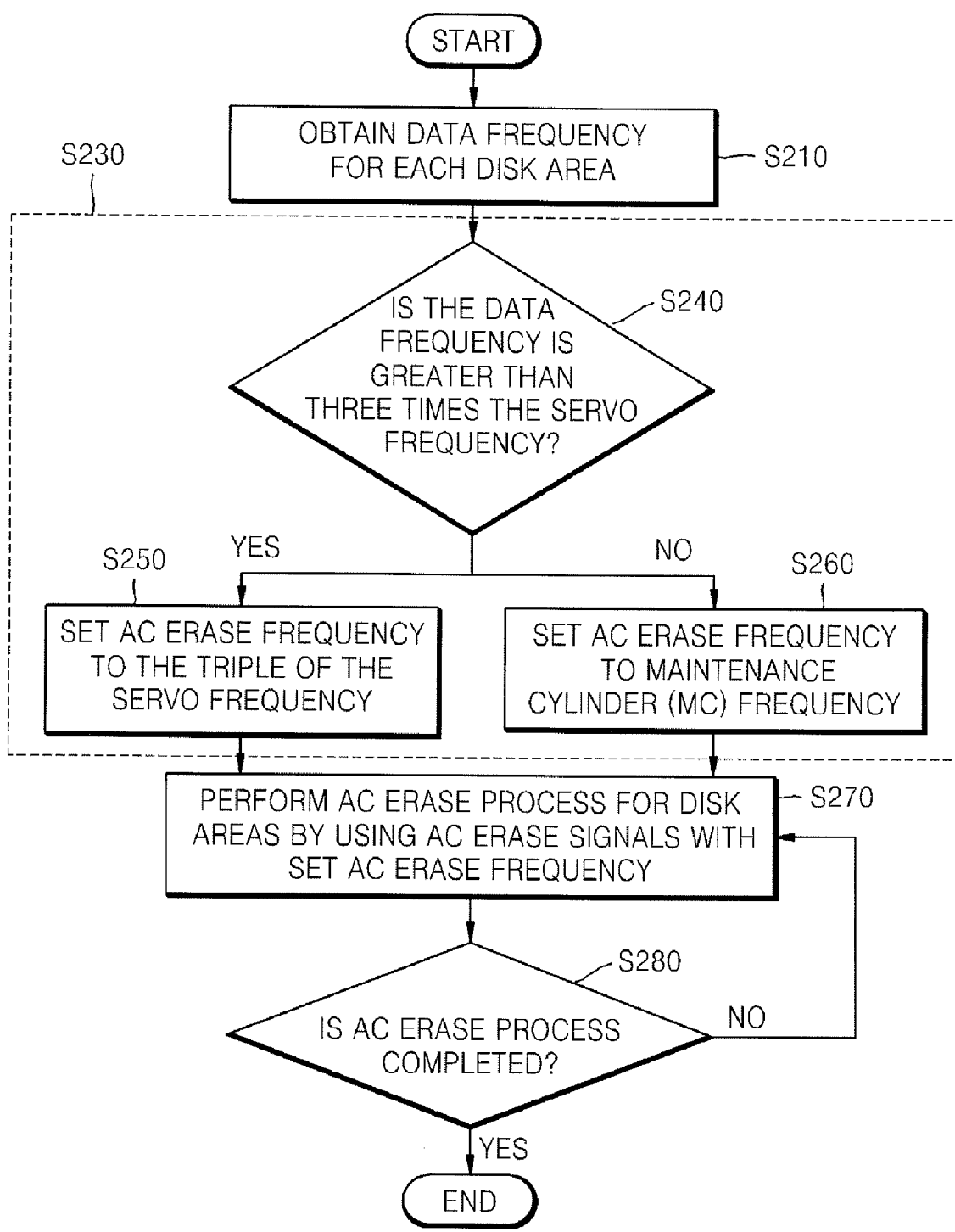
FIG. 2 is a flowchart illustrating a method of setting an AC erase frequency according to an embodiment of the present general inventive concept.

FIG. 2 is a flowchart illustrating a method of setting an AC erase frequency according to an embodiment of the present general inventive concept.

Referring to FIG. 2, a method of setting the AC erase frequency according to an embodiment of the present general inventive concept may include obtaining a data frequency, in operation S210, and setting an AC erase frequency in operation S230. In obtaining a data frequency in operation S210, a data frequency is obtained for each disk area. In setting an AC erase frequency in operation S230, an AC erase frequency for each disk area is set based on a data frequency for each disk area.

In obtaining a data frequency in operation S210, it is possible to obtain a data frequency of each disk area based on a cylinder number of each disk area.

In setting an AC erase frequency in operation S230, it is possible to set the AC erase frequency so as to be greater than a frequency in which interference occurs among AC erase signals. In setting an AC erase frequency in operation S230, it is possible to set the AC erase frequency so that an AC erase frequency of the inner zone of the disk area is lower than that of the outer zone of the disk area.

Figure 3A:
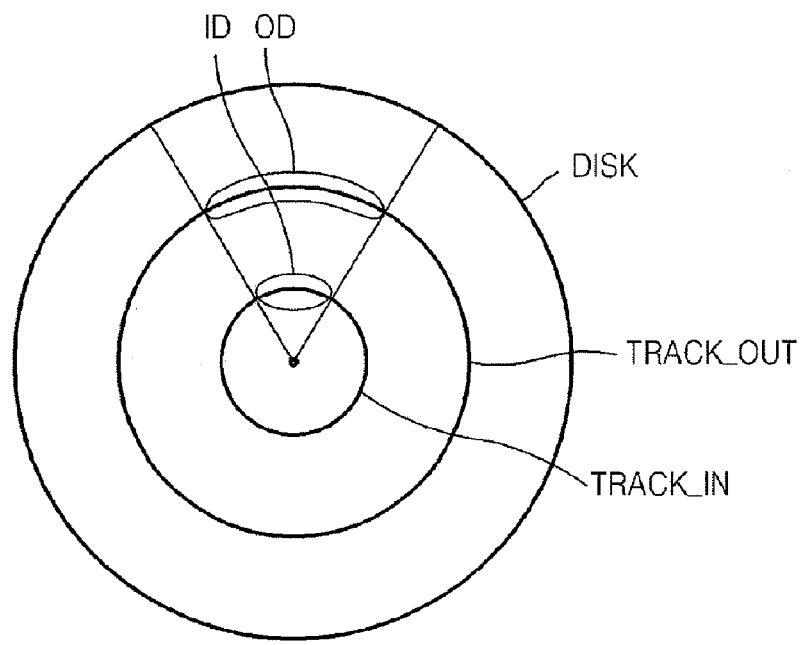
FIG. 3 illustrates a data frequency difference between inner and outer zones of a disk.
Figure 3B:
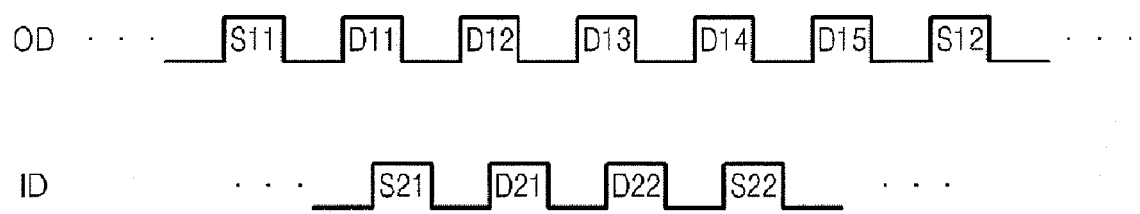

On the other hand, in a general AC erase method, an AC erase signal with the same AC erase frequency is recorded onto the inner and outer zones of the disk. When the AC erase signal with the same AC erase frequency is recorded onto the inner and outer zones of the disk, interference may occur among AC erase signals in the inner zone of the disk. Referring to FIG. 3A, a data frequency of the inner zone ID of a disk DISK is lower than that of the outer zone OD of the disk DISK. In FIG. 3B, two data signals D21 and D22 are located between servo signals S21 and S22 in the inner zone, and five data signals D11 through D15 are located between servo signals S11 and S12 in the outer zone.

However, in the method of setting the AC erase frequency according to the current embodiment, the AC erase frequency is set based on the data frequency of the disk area. Accordingly, it is possible to reduce interference from occurring among AC erase signals in the inner zone ID.

Figure 4:
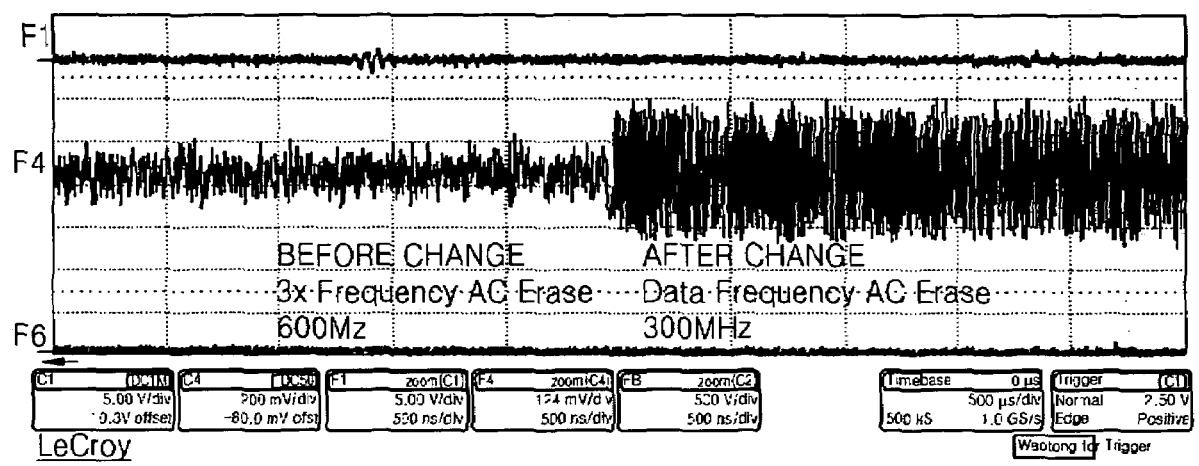
FIG. 4 illustrates waveforms of AC signals with a general AC erase frequency and waveforms of AC signals with an AC erase frequency that is set based on a data frequency of a disk area according to an embodiment of the present general inventive concept.

FIG. 4 illustrates waveforms of AC signals with a general AC erase frequency and waveforms of AC signals with an AC erase frequency that is set based on a data frequency of a disk area according to an embodiment of the present general inventive concept.

On the left drawing of FIG. 4, it is illustrated that interference occurs among the AC signals, thereby reducing amplitudes of the AC signals, when AC signals with a general AC erase frequency are recorded in the inner zone ID. However, on the right drawing of FIG. 4, it is illustrated that no interference occurs among the AC signals, when AC signals with an AC erase frequency according to the embodiment of the present general inventive concept are recorded in the inner zone ID.

Returning to FIG. 2, in setting an AC erase frequency in operation S230, it is possible to set the AC erase frequency to a triple of a servo frequency, when the data frequency is greater than the triple of the servo frequency in operations S240 and S250. In setting the AC erase frequency in operation S230, it is possible to set the AC erase frequency to a maintenance cylinder (MC) frequency, when the data frequency is less than the triple of the servo frequency in operations S240 and S260.

In addition, when the data frequency is less than the triple of the servo frequency, it is possible to set the AC erase frequency to a value less than the triple of the servo frequency.

The method of setting an AC erase frequency according to the above embodiment of the present general inventive concept may be applied to an AC erase method. It is possible to perform an AC erase process for each area by using the AC erase frequency that is set based on the data frequency of each disk area in operation S270.

Figure 5:
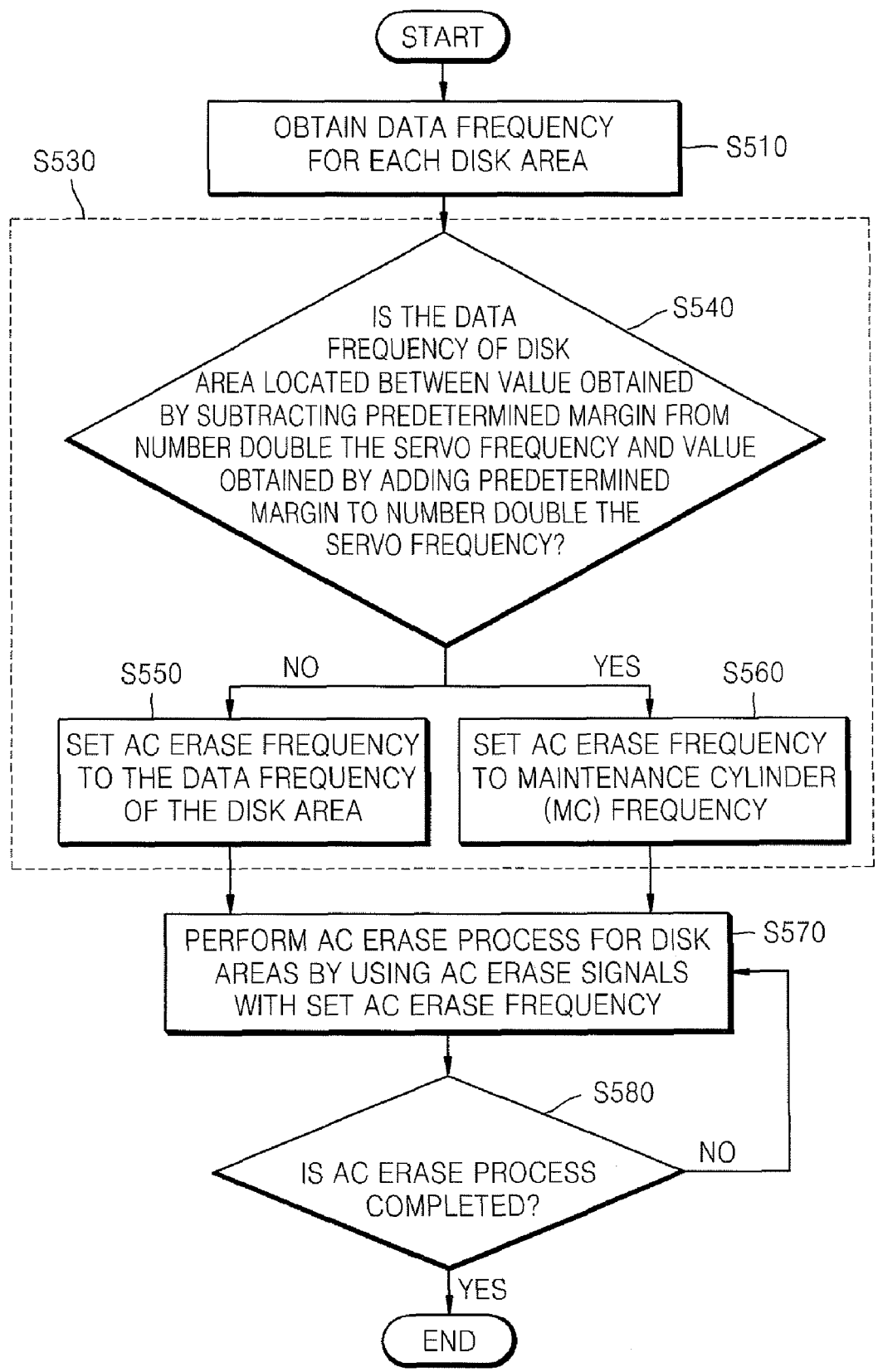
FIG. 5 is a flowchart illustrating a method of setting an AC erase frequency using a data frequency of a disk area according to another embodiment of the present general inventive concept.

FIG. 5 is a flowchart illustrating a method of setting an AC erase frequency using a data frequency of a disk area according to another embodiment of the present general inventive concept.

Referring to FIG. 5, in setting an AC erase frequency in operation S530 of the method of setting an AC erase frequency according to this embodiment of the present general inventive concept, when the data frequency of the disk area is less than a value obtained by subtracting a predetermined margin from a number double the servo frequency or when the data frequency of the disk area is greater than a value obtained by adding a predetermined margin to a number double the servo frequency, it is possible to set the AC erase frequency to the data frequency of the disk area in operations S540 and S550.

In setting the AC erase frequency, when the data frequency of the disk area is located between the value obtained by subtracting a predetermined margin from a number double the servo frequency and the value obtained by adding a predetermined margin to a number double the servo frequency, it is possible to set the AC erase frequency to the MC frequency in operations S540 and S560.

The disk area may be a zone including at least one track. That is, in the method of setting an AC erase frequency according to this embodiment of the present general inventive concept, it is possible to set a separate AC erase frequency for each zone.

The method of setting an AC erase frequency according to this embodiment of the present general inventive concept may be also applied to an AC erase method. It is possible to perform an AC erase process for each area by using an AC erase frequency that is set based on the data frequency of each disk area in operation S570.

As described above, in the method of setting an AC erase frequency and the AC erase method according to an embodiment of the present general inventive concept, the AC erase frequency is set based on the data frequency of the disk area, and the AC erase process is performed by using AC erase signals with the AC erase frequency. Accordingly, it is possible to reduce interference among the AC erase signals.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of setting an AC (alternating current) erase frequency of a disk drive, the method comprising:
   obtaining a data frequency for each disk area; and
   setting an AC (alternating current) erase frequency for each disk area based on the data frequency for each disk area.

2. The method of claim 1, wherein in the obtaining of the data frequency, the data frequency of the disk area is obtained based on a cylinder number of the disk area.

3. The method of claim 1, wherein in the setting of the AC erase frequency, the AC erase frequency is set so as to be greater than a frequency in which interference occurs among AC erase signals.

4. The method of claim 1, wherein in the setting of the AC erase frequency, the AC erase frequency is set so that an AC erase frequency of an inner zone of the disk area is lower than that of an outer zone of the disk area.

5. The method of claim 1, wherein in the setting of the AC erase frequency, when the data frequency is greater than a triple of a servo frequency, the AC erase frequency is set to the triple of the servo frequency.

6. The method of claim 5, wherein in the setting of the AC erase frequency, when the data frequency is less than the triple of the servo frequency, the AC erase frequency is set to a value less than the triple of the servo frequency.

7. The method of claim 5, wherein in the setting of the AC erase frequency, when the data frequency is less than the triple of the servo frequency, the AC erase frequency is set to an MC (maintenance cylinder) frequency.

8. The method of claim 1, wherein in the setting of the AC erase frequency, when the data frequency is less than a value obtained by subtracting a predetermined margin from a number double the servo frequency or when the data frequency is greater than a value obtained by adding a predetermined margin to the number double the servo frequency, the AC erase frequency is set to the data frequency of the disk area.

9. The method of claim 1, wherein in the setting of the AC erase frequency, when the data frequency is located between a value obtained by subtracting a predetermined margin from a number double the servo frequency and a value obtained by adding a predetermined margin to the number double the servo frequency, the AC erase frequency is set to an MC (maintenance cylinder) frequency.

10. The method of claim 1, wherein the disk area is a zone including at least one track.

11. An AC (alternating current) erase method of a disk drive, the AC erase method comprising:
   obtaining a data frequency for each disk area;
   setting an AC (alternating current) erase frequency for each disk area based on the data frequency for each disk area; and
   performing an AC (alternating current) erase process for each disk area by using the AC erase frequency for each disk area.

12. The AC erase method of claim 11, wherein in the obtaining of the data frequency, the data frequency of the disk area is obtained based on a cylinder number of the disk area.

13. The AC erase method of claim 11, wherein in the setting of the AC erase frequency, the AC erase frequency is set to be greater than a frequency in which interference occurs among AC erase signals.

14. The AC erase method of claim 11, wherein in the setting of the AC erase frequency, the AC erase frequency is set so that an AC erase frequency of an inner zone of the disk area is lower than that of an outer zone of the disk area.

15. The AC erase method of claim 11, wherein in the setting of the AC erase frequency,
   when the data frequency is greater than a triple of a servo frequency, the AC erase frequency is set to the triple of the servo frequency, and
   when the data frequency is less than the triple of the servo frequency, the AC erase frequency is set to a value less than the triple of the servo frequency or an MC (maintenance cylinder) frequency.

16. A method to set an AC (alternating current) erase frequency for a disk in a disk drive, the method comprising:
   obtaining a data frequency for each of a plurality of disk areas of the disk; and
   setting AC erase frequencies for each of the plurality of disk areas, such that the AC erase frequencies of a first disk area does not cause interference in AC erase frequencies of a second disk area.

17. The method of claim 16, wherein the second disk area corresponds to an inner disk area and the first disk area corresponds to an outer disk area.

18. The method of claim 16, further comprising
   performing an AC erase process for each of the plurality of disk areas by using the AC erase frequencies of the corresponding disk areas.

19. The method of claim 16, wherein the data frequency for a disk area corresponds to a cylinder number of the disk area.

20. The method of claim 16, wherein the AC erase frequency for each disk area is based on a servo frequency.

* * * * *